United States Patent
Hendrix et al.

(10) Patent No.: US 7,641,350 B2
(45) Date of Patent: Jan. 5, 2010

(54) FRONT SURFACE MIRROR FOR PROVIDING WHITE COLOR UNIFORMITY FOR POLARIZED SYSTEMS WITH A LARGE RANGE OF INCIDENCE ANGLES

(75) Inventors: Karen Denise Hendrix, Santa Rosa, CA (US); Andrew Thomas Taylor, Santa Rosa, CA (US); Apurba Pradhan, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 649 days.

(21) Appl. No.: 11/431,688

(22) Filed: May 10, 2006

(65) Prior Publication Data

US 2007/0121074 A1 May 31, 2007

Related U.S. Application Data

(60) Provisional application No. 60/740,148, filed on Nov. 28, 2005.

(51) Int. Cl.
*G02B 5/08* (2006.01)
(52) U.S. Cl. ..................................................... 359/883
(58) Field of Classification Search ................. 359/883, 359/838
See application file for complete search history.

(56) References Cited

U.S. PATENT DOCUMENTS

| | | | | |
|---|---|---|---|---|
| 5,448,404 A | 9/1995 | Schrenk et al. | ............. | 359/584 |
| 5,708,530 A | 1/1998 | Huang | ......................... | 359/634 |
| 5,835,273 A | 11/1998 | Ida et al. | ..................... | 359/584 |
| 5,844,638 A | 12/1998 | Ooi et al. | ...................... | 349/10 |
| 5,882,774 A | 3/1999 | Jonza et al. | ................. | 428/212 |
| RE36,850 E | 9/2000 | Nakayama et al. | ............ | 353/31 |
| 6,120,152 A | 9/2000 | Nakayama et al. | ............ | 353/31 |
| 6,331,916 B1 | 12/2001 | Mukawa | ...................... | 359/630 |
| 6,407,862 B2 | 6/2002 | Moshrefzadeh | ............. | 359/584 |
| 6,462,878 B1 | 10/2002 | Kartner et al. | ............. | 359/588 |
| 6,535,336 B2 | 3/2003 | Tatsumi | ...................... | 359/584 |
| 6,565,222 B1 | 5/2003 | Ishii et al. | .................... | 359/883 |
| 6,634,756 B1 | 10/2003 | Shimizu | ...................... | 353/74 |
| 6,648,475 B1 | 11/2003 | Roddy et al. | .................. | 353/31 |
| 6,648,482 B2 | 11/2003 | Hatakeyama et al. | ....... | 359/855 |
| 6,650,472 B1 | 11/2003 | Adachi et al. | ............... | 359/453 |
| 6,667,095 B2 | 12/2003 | Wheatley et al. | ............ | 428/212 |
| 6,678,015 B2 | 1/2004 | Yi et al. | ...................... | 348/782 |
| 6,698,890 B1 | 3/2004 | Jorke | ............................. | 353/7 |
| 6,704,475 B2 | 3/2004 | Jin et al. | ....................... | 385/18 |
| 6,738,200 B2 | 5/2004 | Handa et al. | ................ | 359/727 |
| 6,752,507 B2 | 6/2004 | Wang et al. | ................. | 362/619 |
| 6,783,253 B2 | 8/2004 | Thomsen et al. | ............ | 359/870 |

(Continued)

*Primary Examiner*—Euncha P Cherry
(74) *Attorney, Agent, or Firm*—Matthew A. Pequignot; Pequignot + Myers LLC (57) ABSTRACT

A fold mirror for a projection display system is designed to lessen a perceived variation in white color balance of light reflected across the mirror wherein the white light is comprised of sub-beams of orthogonal polarization states. The mirror comprises a metal reflective layer and a plurality of optically transparent layers, wherein thicknesses and materials of the optically transparent layers are such that wavelength-averaged reflectance for p-polarized incident green light varies by less than 1%, wavelength-averaged reflectance for s-polarized blue light varies by less than 1.5%, and wavelength-averaged reflectance for s-polarized red light varies by about 4% over a range of angles of incidence between 0 and 65 degrees.

12 Claims, 10 Drawing Sheets

U.S. PATENT DOCUMENTS

| | | | |
|---|---|---|---|
| 6,844,968 B2 | 1/2005 | Adachi et al. | 359/453 |
| 6,857,747 B2 | 2/2005 | Pentico et al. | 353/31 |
| 6,870,668 B2 | 3/2005 | Ozawa | 359/352 |
| 6,894,838 B2 | 5/2005 | Mizrahi et al. | 359/584 |
| 6,900,951 B2 | 5/2005 | Amanai et al. | 359/729 |
| 6,919,992 B2 | 7/2005 | Koyama | 359/629 |
| 6,921,177 B2 | 7/2005 | Schaefer | 359/883 |
| 6,934,085 B2 | 8/2005 | Stachowiak et al. | 359/585 |
| 6,943,947 B2 | 9/2005 | Adachi et al. | 359/453 |
| 6,956,624 B2 | 10/2005 | Hirata et al. | 348/744 |
| 6,958,796 B2 | 10/2005 | Takizawa | 349/114 |
| 6,962,416 B2 | 11/2005 | Ohara | 353/70 |
| 6,965,483 B2 | 11/2005 | Lindblom | 359/726 |
| 2003/0035972 A1* | 2/2003 | Hanson et al. | 428/480 |
| 2004/0057116 A1 | 3/2004 | Ogawa | 359/586 |
| 2004/0141157 A1 | 7/2004 | Ramachandran et al. | 353/70 |
| 2004/0246444 A1 | 12/2004 | Hirata et al. | 353/31 |
| 2005/0105797 A1 | 5/2005 | Rao | 382/162 |
| 2005/0128381 A1 | 6/2005 | Tanose et al. | 349/106 |
| 2005/0185143 A1 | 8/2005 | Bossche et al. | 353/31 |

\* cited by examiner

FRONT SURFACE MIRROR FOR PROVIDING WHITE COLOR UNIFORMITY FOR POLARIZED SYSTEMS WITH A LARGE RANGE OF INCIDENCE ANGLES

CROSS-REFERENCE TO RELATED APPLICATIONS

The present invention claims priority from U.S. Provisional Patent Application No. 60/740,148 filed Nov. 28, 2005, entitled "Front Surface Mirror for providing White Color Uniformity for Polarized Systems with a Large Range of Incidence Angles", which is incorporated herein by reference.

TECHNICAL FIELD

The present invention relates to projection systems and methods and more particularly to a coated fold mirror for use in a compact projection system.

BACKGROUND OF THE INVENTION

In a front projection system, a projector and a viewer are on the same side of a display surface, with an image from the projector reflecting from the display surface to the viewer. Front projection systems are typically on-axis projection systems in which the image is created and projected along a straight axis that is perpendicular to the display surface.

In a rear-projection system, a projector and a viewer are on the opposite sides of a screen. Rear projection television (RPTV) displays have found great consumer interest due to a large image size. A primary disadvantage of an RPTV system is a set volume and depth. In RPTV systems, minimizing the straight line projection path length by folding the optical path enables a cabinet housing a display surface and a projection light engine to be more compact. Thus, the optical path along which light propagates through these projection systems is typically folded with a large front surface mirror (FSM), known in the art as a fold mirror.

Figure 1:
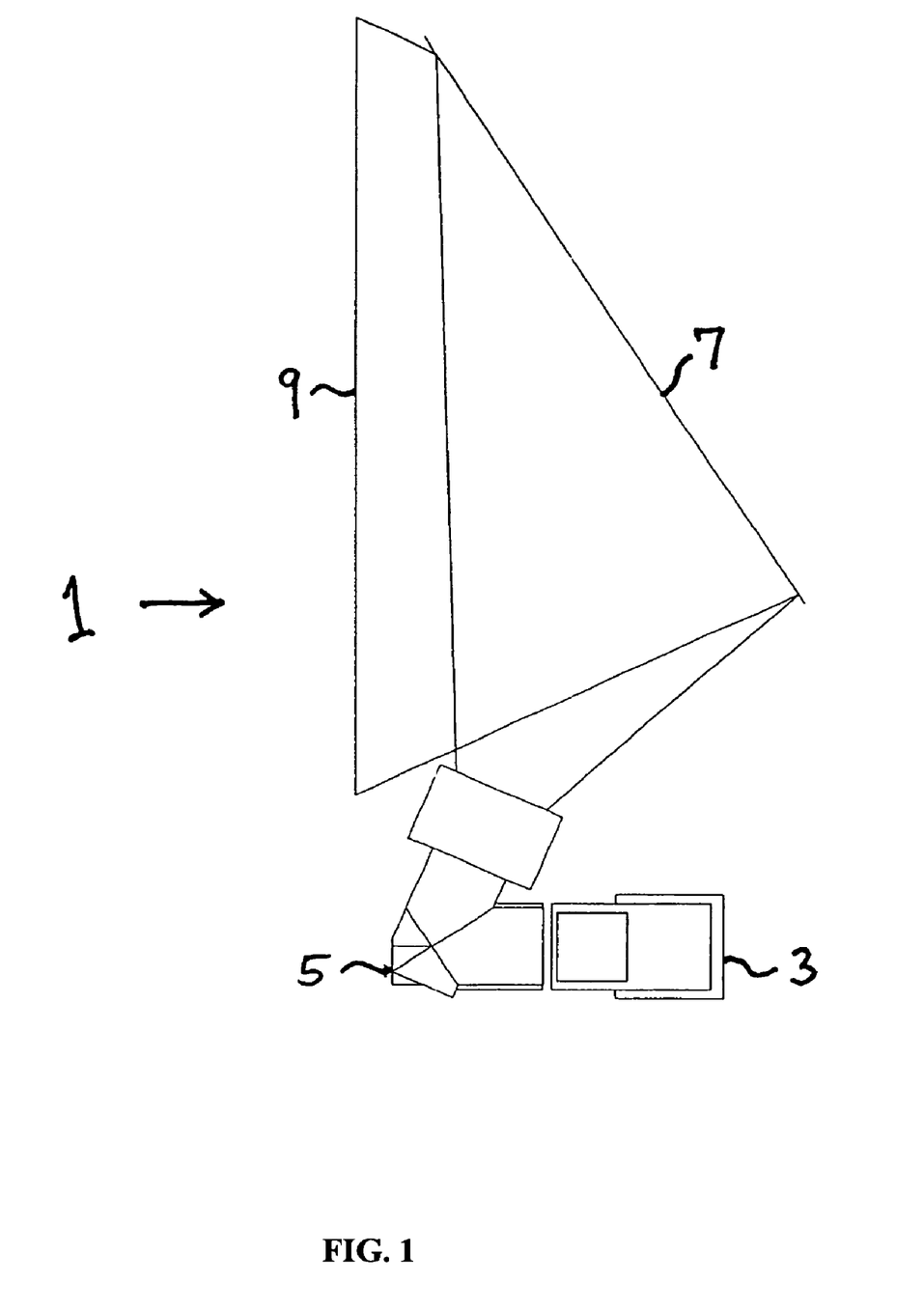
FIG. 1 is a diagram of a typical rear-projection system according to the prior art.

FIG. 1 provides an example of a prior art rear-projection system 1 comprising a light engine 3, a projection lens 5, a fold mirror 7, and a screen 9. The light engine 3 introduces light into the projection lens 5, which, in turn, projects the light onto the fold mirror 7 which reflects the light onto the screen 9.

In RPTV systems, images are composed by modulating the intensity of red, green, and blue components of light so as to form constantly changing images. As used herein, the term "component", or a light beam, refers to a portion of a light transmission. For example, where a light transmission contains light of various wavelengths in the visible spectrum (e.g., blue, red, and green), the light transmission may be separated into a plurality of components, each corresponding to a range of wavelengths (i.e., color bands), such as blue, red, or green, in the visible spectrum. Further, a light transmission may comprise polarized light oriented in one or more planes.

For example, a polarization-based RPTV system is disclosed in U.S. Pat. No. 6,634,756 issued to Shimizu on Oct. 21, 2003, incorporated herein by reference. A rear-projection display system comprises a light source, a polarizing beam-splitter (PBS) that receives light from the light source, a projection lens that receives an image from the beam-splitter, a rear-projection screen, and a fold mirror that receives the image from the projection lens and reflects it onto the screen. In this system the beam-splitter having an inclined reflecting element is placed between an LCoS imager and a projection lens that projects the light onto a fold mirror whence it is reflected onto a screen. The beam-splitter receives an image, and reflects the image off the reflecting element at an angle of incidence that is substantially unequal to 45 degrees.

A part of an RPTV system, namely a polarization-based color management system, is disclosed in U.S. Pat. No. 6,678,015 in the names of Yi et al issued on Jan. 13, 2004 incorporated herein by reference. The systems comprises: a dichroic filter for allowing a selected one of light components, included in an incident light emitted from a light source, to be transmitted therethrough along a travel path of the incident light while reflecting the remaining light components in a direction perpendicular to the travel path of the incident light; a first synthesizing unit for receiving the light components reflected by the dichroic filter and separating the received light components from each other, the first synthesizing unit also serving to form images respectively corresponding to the separated light components via a first liquid crystal display (LCD) and a second LCD, to synthesize the images, and to allow the synthesized image to be directed in the same direction as the incident light introduced into the dichroic filter; a second synthesizing unit for receiving the light component transmitted through the dichroic filter, forming an image corresponding to the received light component via a third LCD, and reflecting the image in a direction perpendicular to the travel path of the incident light introduced into the dichroic filter; and a third synthesizing unit for synthesizing light beams respectively containing the images formed in the first and second synthesizing units, and allowing the synthesized light to be directed in the same direction as the incident light introduced into the dichroic filter. The first synthesizing unit comprises: a first color selecting retarder; a polarized beam splitter; the first LCD; the second LCD; and a second color selecting retarder. The second synthesizing unit comprises: a third color selecting retarder; a second polarized beam splitter; and a third LCD. The third synthesizing unit may comprises a third polarized beam splitter.

In optical systems using one or more mirrors that fold the beam path to the output screen, it is desired for the white light incident on the screen to be of uniform intensity and white uniformity across the entire viewing screen although, most often, it is not achieved. Quality of the image on the screen depends, in part, on reflectance of the fold mirror defined in the art as a ratio of energy of reflected to incident light. Besides properties of the mirror, a value of reflectance depends on properties of the incident light, in particular on an angle of incidence (AOI) of the light. In RPTV systems, different portions of a beam of light impinge on a fold mirror with largely varying angles of incidence causing variations in reflectance across the mirror surface. Furthermore, since a value of reflectance depends on polarization of incident light, reflectance for differently colored sub-beams, or components, varies differently contributing to image distortion. Thus special efforts need to be taken to provide uniform intensity and white color uniformity across the viewing screen.

There are known in the art methods of modifying a fold mirror in order to reduce image distortion:

U.S. Pat. No. 6,648,482 in the names of Hatakeyama et al issued on Nov. 18, 2003, discloses a polygon mirror comprising a reflecting surface and a single-layer film of uneven thickness, designed to ensure that variation in reflectance is small over a wide range of angles of incidence. The method of manufacturing the prism shaped polygon mirror having a film on the reflecting surface comprises a step of forming a coated film of a solution on the reflecting surface by rotating the polygon mirror, and the solution is applied only in the area of which the distance from the axis of rotation of the polygon mirror is at least Ri in the application step, where Ri is the minimum distance between the reflecting surface and the axis of rotation.

US Pat. Appl. No. 20040141157 by Ramachandran et al discloses an image projection system comprising a asymmetrically curved mirror for distortion compensation of an optical image.

US Pat. Appl. No. 20040057116 by Ogawa, discloses an optical filter comprising a substrate and an optical conversion film inclined with respect to the substrate by being continuously thinner from one end to another end, the optical conversion film comprising two types of thin films and having different refractive indices and being alternately stacked.

The aforementioned references are all incorporated herein by reference.

Although the aforementioned methods of altering the fold mirror by using a curved reflective surface and/or uneven covering layers appear to perform their intended function, they provide elaborate and expensive solutions.

It is therefore an object of this invention to provide a simple and cost-effective method for image distortion reduction in a polarization-based rear-projection system.

It is another object of this invention to increase a white balance across the viewing screen by lessening the intensity difference between light of differing orthogonal polarizations reflected from the fold mirror in an optical system.

It is another object of this invention to increase the visible white balance across the viewing screen by lessening the variation in intensity of green light over a range of angles of incidence.

It is a further object of this invention to provide a mirror with a coating designed to lessen a perceived variation in white color balance of light reflected across the coating wherein the white light is comprised of sub-beams of orthogonal polarization states.

SUMMARY OF THE INVENTION

In accordance with one aspect of the invention, there is provided a mirror for a projection system for receiving polarized light from a light source, the mirror comprising a metal reflective layer and a plurality of optically transparent layers disposed over the metal reflective layer, wherein thicknesses and materials of the optically transparent layers are such that a wavelength-averaged reflectance of the mirror for p-polarized incident light varies by less than 2% over a range of angles of incidence between 0 and 65 degrees.

In accordance with another aspect of this invention, there is provided a projection display system comprising: a beam-forming means for forming a light beam; the light beam comprising p-polarized light of a first color and s-polarized light of a second color; and, a mirror for reflecting the light beam received from the beam-forming means; wherein portions of the light beam impinge on the mirror at all angles from a range of angles of incidence between 9.5 and 65 degrees; the mirror comprising a metal layer; and, a plurality of optically transparent layers disposed over the metal layer; wherein thicknesses and materials of said optically transparent layers are such that a wavelength-averaged reflectance of the mirror for the p-polarized light of the first color varies by less than 2% over the range of angles of incidence.

In accordance with another aspect of this invention a mirror is provided for a projection system, the mirror comprising: a metal reflective layer; and a plurality of optically transparent layers disposed over the metal reflective layer; wherein thicknesses and materials of said optically transparent layers are such that when color-uniform light comprising p-polarized first color light and s-polarized second color light impinges on the mirror at a plurality of angles of incidence varying from 0 to 65 degrees, the mirror reflects reflected light having CIE chromaticity coordinates x and y varying across the mirror by no more than about 0.003 each.

In accordance with another aspect of this invention a coating is provided that has less variance in average reflectivity of green p-polarized light incident thereon for a predetermined range of angles of incidence between 0 degrees and 65 degrees, than for each of the average variances for s-polarized red and blue light.

BRIEF DESCRIPTION OF THE DRAWINGS

The invention will be described in greater detail with reference to the accompanying drawings which represent preferred embodiments thereof, wherein.

DETAILED DESCRIPTION

Figure 2:
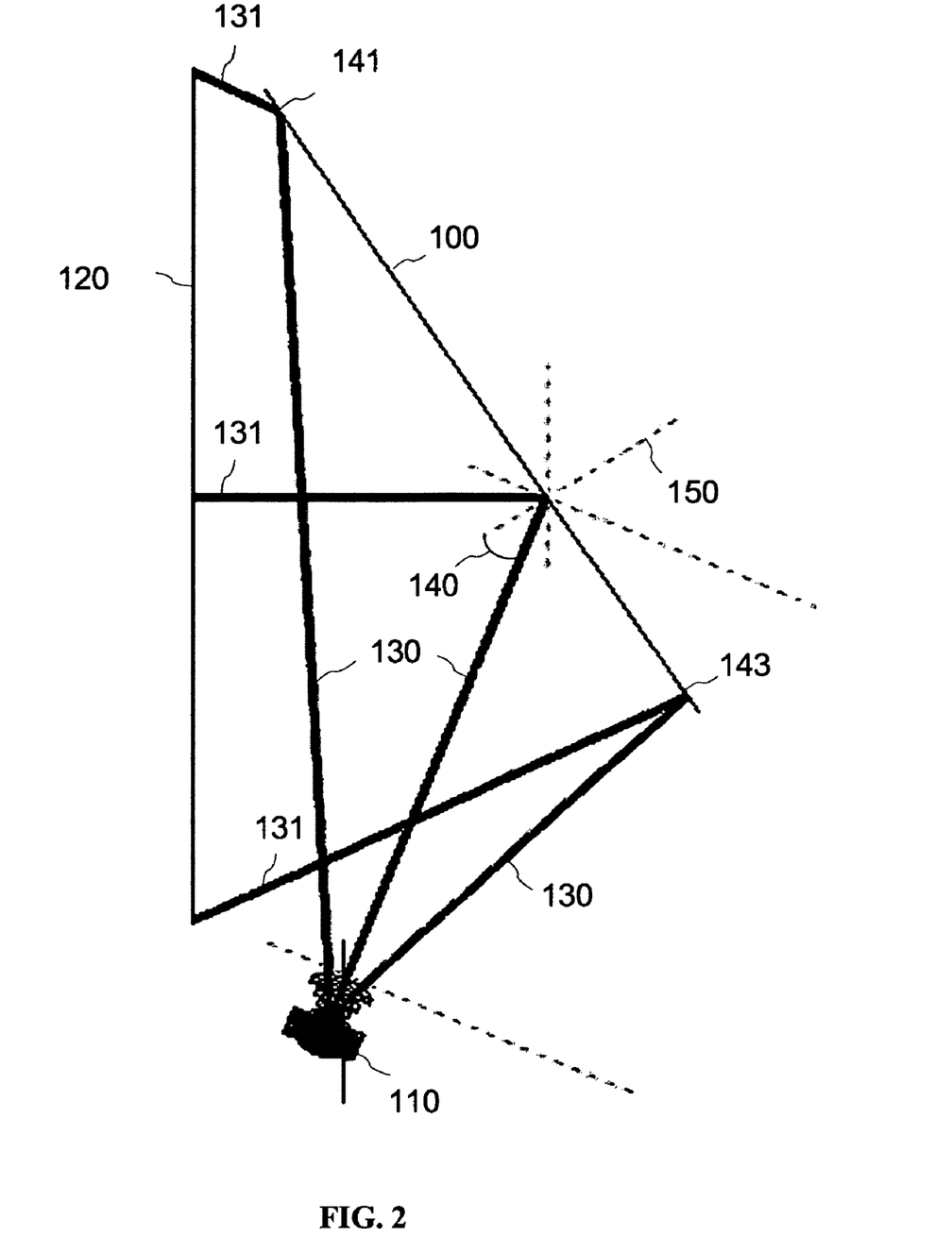
FIG. 2 is a diagram of a rear-projection system according to the current invention.

An exemplary embodiment of the current invention will be described herein. With reference to FIG. 2, a rear-projection display system comprises a beam-forming means 110, a fold mirror 100, and a rear projection screen 120. The beam forming means 110, herein also referred to as a light engine 110, comprises a light source, e.g. an Osram UHP 150 W lamp, an optional polarizing light pipe, e.g. made by Casix Inc., and a color management system, e.g. ColorQuad™ from Colorlink. A preferred color management system is disclosed in U.S. Pat. No. 6,857,747 in the names of Pentico et al. which is incorporated herein by reference.

Figure 3:
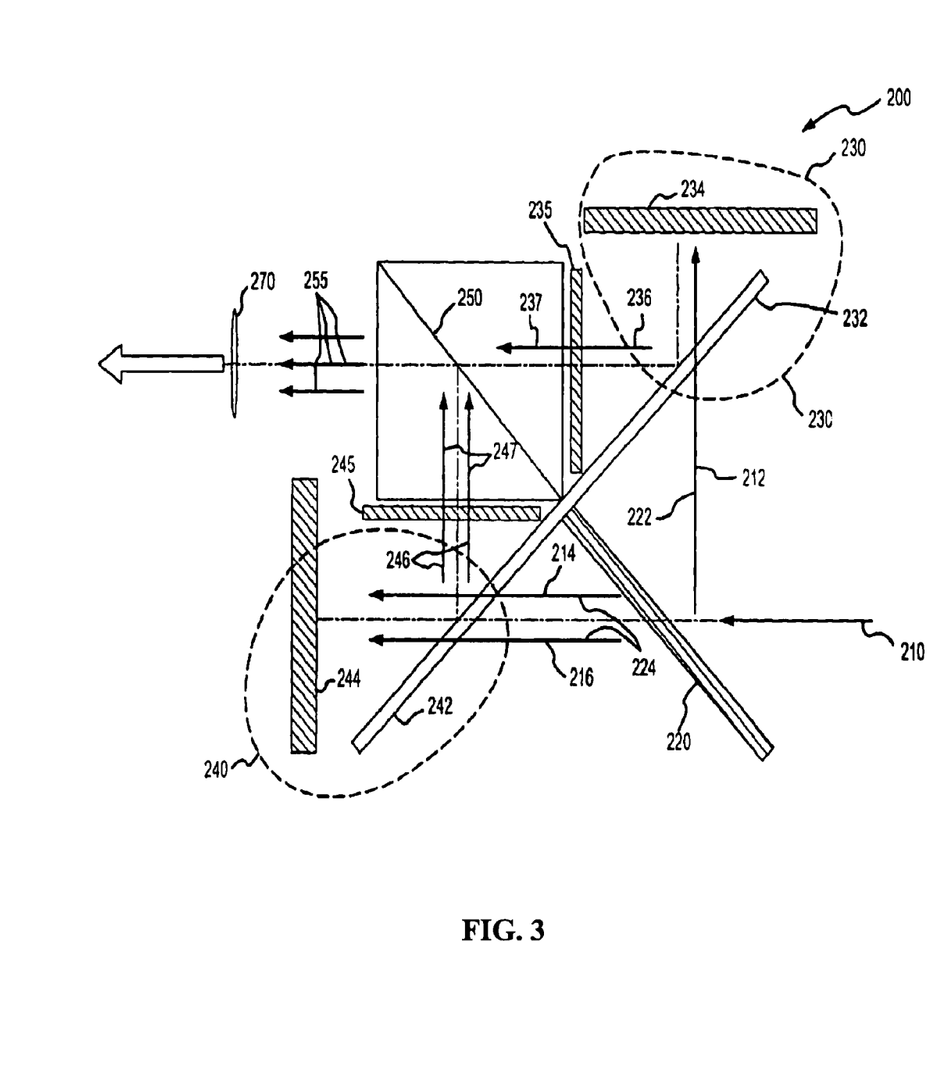
FIG. 3 illustrates a color management system.

With reference to FIG. 3, the color management system 200 includes a light separator 220, a first image assimilator 230, a second image assimilator 240, a first analyzer 235, a second analyzer 245, and a light combiner 250. Light separator 220 is a dichroic beamsplitter; it receives a light beam 210 from a source, separates the light beam 210 into two or more components 212, 214, 216, and emits two or more light beams 222, 224, each comprising one or more of the components. First output light beam 222 comprises a red component 212 and second output light beam 224 comprises a blue component 214 and a green component 216.

With further reference to FIG. 3, first image assimilator 230, which comprises first polarizing beamsplitter 232 and first microdisplay 234, is positioned to receive first output light beam 222. A second image assimilator 240, which comprises second polarizing beamsplitter 242 and second microdisplay 244, is positioned to receive second output light beam 224. Microdisplays 234, 244 are configured to superimpose spatial information on the light beam so as to produce a light beam that comprises spatial information. First image assimilator 230 receives a first output light beam 222, rotates its polarization orientation, imparts first spatial information on it, and emits a first modified light beam 236 comprising first spatial information and noise. Second image assimilator 240 receives second output light beam 224, rotates its polarization orientation, imparts second spatial information on it, and emits a second modified light beam 246 comprising second spatial information and noise.

Image assimilator 240 comprises a polarizing filter for producing a differentiated light output comprising the second component 214 and the third component 216, where the orientation of the second component 214 is rotated to be orthogonal to the orientation of the third component 216. Image assimilator 240 further comprises a second polarizing beamsplitter positioned to receive from the polarizing filter the differentiated light output. This second polarizing beamsplitter is configured for separating the second component 214 from the third component 216 before substantially transmitting the second component to be received by the second microdisplay and before substantially transmitting the third component to be received by a third microdisplay.

The color management system 200 also includes analyzers 235, 245 for noise reduction and a light combiner 250 for combining the filtered light beams 237, 247 into a single filtered light output 255. The light engine is configured so that a polarization vector of the second beam 247 is parallel to the mirror, so the second beam 247 is hereinafter also referred to as a beam of s-polarized light, and the first beam 237—as a beam of p-polarized light. Finally, the color management system includes a projection lens 270 for projecting an output light beam containing spatial information for projecting an image. Therefore, the beam-forming means forms the light beam 255 comprising p-polarized green light and s-polarized red and blue light.

Figure 4:
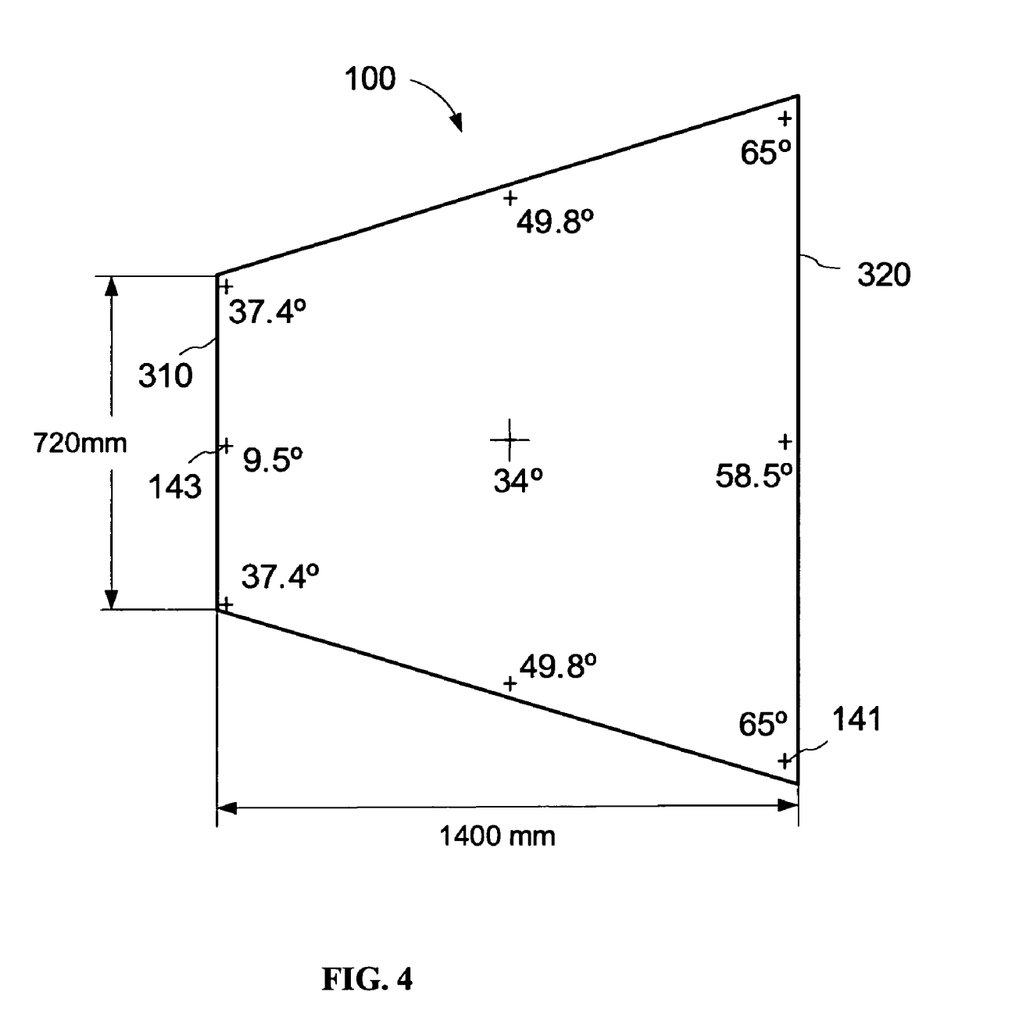
FIG. 4 is a top view of a fold mirror in a rear-projection system according to the current invention.

With reference to FIGS. 2 and 4, light engine 110 forms the light beam represented by rays 130. The light beam 130 impinges on the mirror 100 and is reflected by the mirror 100 to the screen 120 as shown by rays 131. An angle between the impinging light 130 and a normal 150 to the mirror 100 is an angle of incidence (AOI) 140. The angle of incidence varies across the mirror 100, which is a flat quadrilateral with a narrow side 310 disposed closer to the light engine 110 than a wider side 320. FIG. 4 provides AOI values for different footprint locations of the mirror thus showing that, in this exemplary embodiment, the light beam impinge on the mirror 100 at all angles from a range of angles of incidence between 9.5 and 65 degrees; the angles of incidence vary from 9.5 degrees at the point 143 to 65 degrees at the point 141.

However, the aforedescribed system wherein mirror 100 comprised a conventional front surface mirror, e.g. HR94, did not provide a sufficient color uniformity across the viewing screen 120, that is white light in certain regions of the viewing screen appeared to be tinted rather than being a pure white. It has been discovered, that the green component was less uniform in intensity across the screen 120 than the red and blue components. Furthermore, the human eye is more sensitive to changes in green than red or blue, so correcting for this variance in intensity of the green light was required.

After analyzing and attempting to understand the difference in variance in intensity for different colors of light, it was found that the variance in intensity for light incident on the mirror at different angles was substantially affected by the particular linear polarization state the light was propagating in, rather than by the color, or wavelength band, of the light itself. Thus, the fact that the green light varied in intensity across the screen more than the red or blue light at different angles of incidence, was discovered to be a primarily function of the state of polarization of the light rather than the color, or wavelength band, of the light.

Hereinafter, relationship between polarization states and color imbalance will be discussed with reference to FIGS. 5-7.

Figure 5:
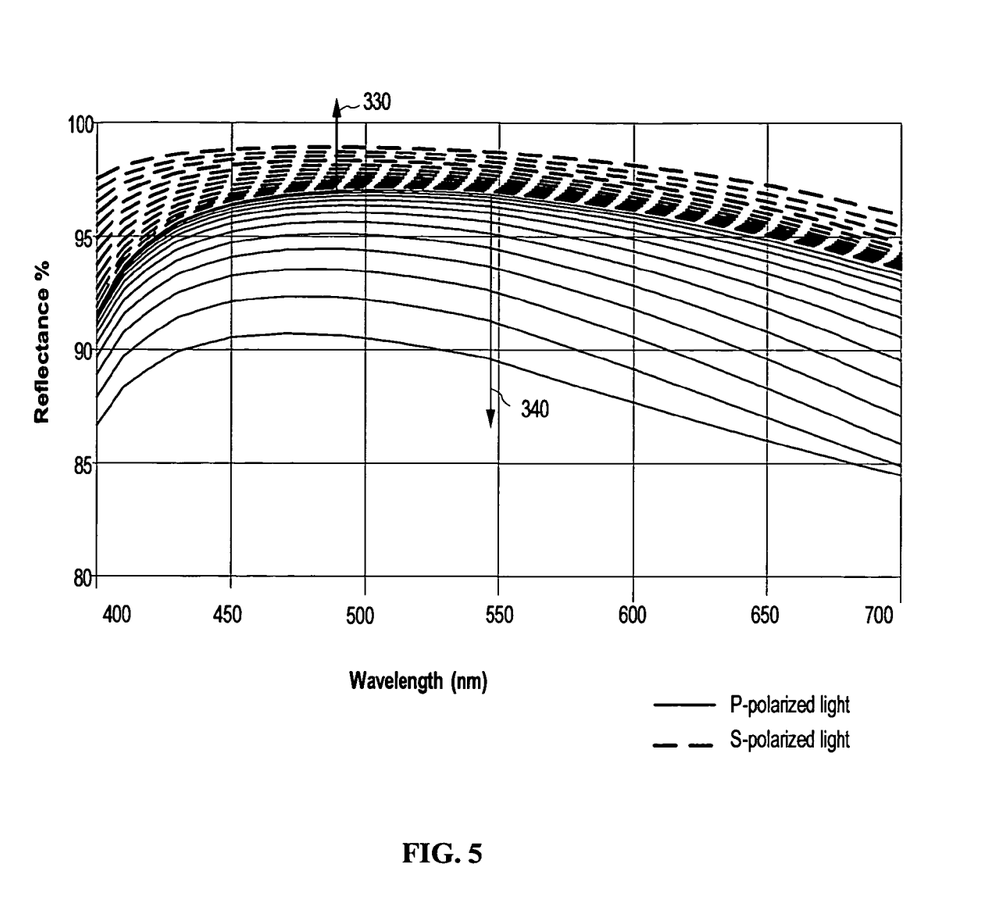
FIG. 5 is a graph of reflectance of s- and p-polarized light vs. wavelength for various AOIs for the prior art mirror.
Figure 6:
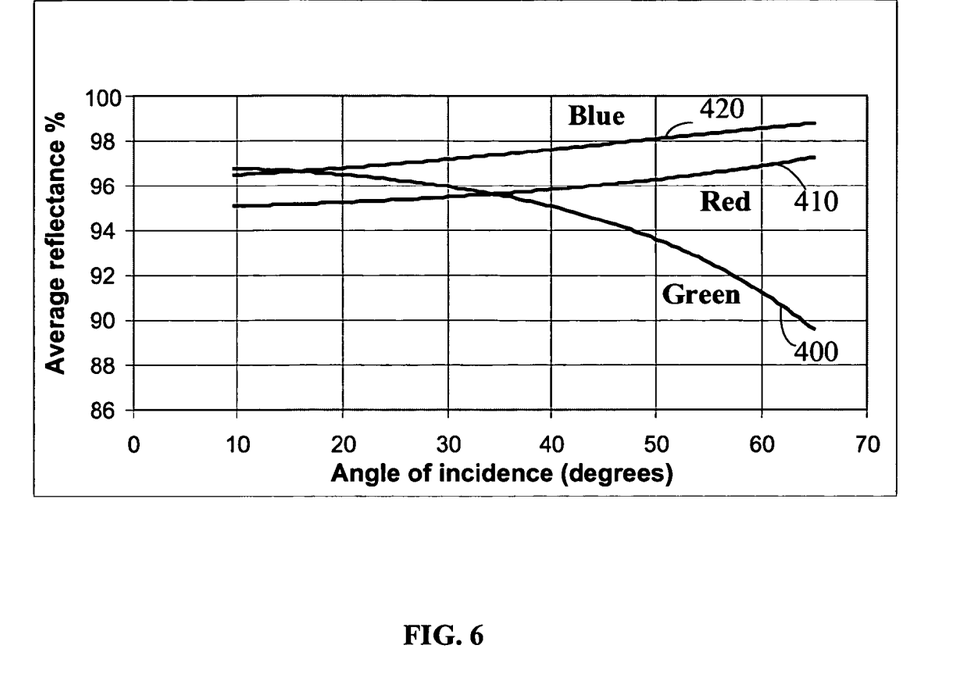
FIG. 6 is a graph of average reflectance of red, blue, and green color bands vs. AOI for the prior art mirror.

FIG. 5 shows how reflectance for s- and p-polarized light depends on AOI for the conventional HR94 mirror. Graphs of reflectance of s-polarized light vs. wavelength are represented by dashed lines, and graphs of reflectance of p-polarized light—by solid lines. There are twelve solid lines and twelve dashed lines, each line correspondent to a fixed AOI from an interval between 10 and 65 degrees with 5 degree steps. At AOI of 10 degrees, a dashed line for s-polarized light is close to a solid line for p-polarized light. Then, with increase of AOI, the reflectance of p-polarized light decreases, as shown by arrow 340, while the reflectance of the s-polarized light increases, as shown by arrow 330.

Thus, for the conventional mirror, the reflectance of the p-polarized light decreases with increasing angle of incidence, while the reflectance of the s-polarized light increases with increasing angle of incidence, with the change in the p-polarized reflectance being more pronounced. The average reflectance of the conventional HR94 mirror for various color bands is shown in FIG. 6. Line 400 represents reflectance averaged over green (490-590 nm) color band, line 410—reflectance averaged over red (590-700 nm) color band, and line 420—over blue (420-490 nm) color band, versus angle of incidence for the appropriate polarizations. The average reflectance for the green band varies more than 7% while the average reflectance for the red and blue bands varies by about 2% over the range of AOI. This difference between the color channels in reflectance variation with angle causes the mixing between the red and blue channels (s-polarization) and the green channel (p-polarization) to vary with position, resulting in a non-uniform white color at the output.

Figure 7:
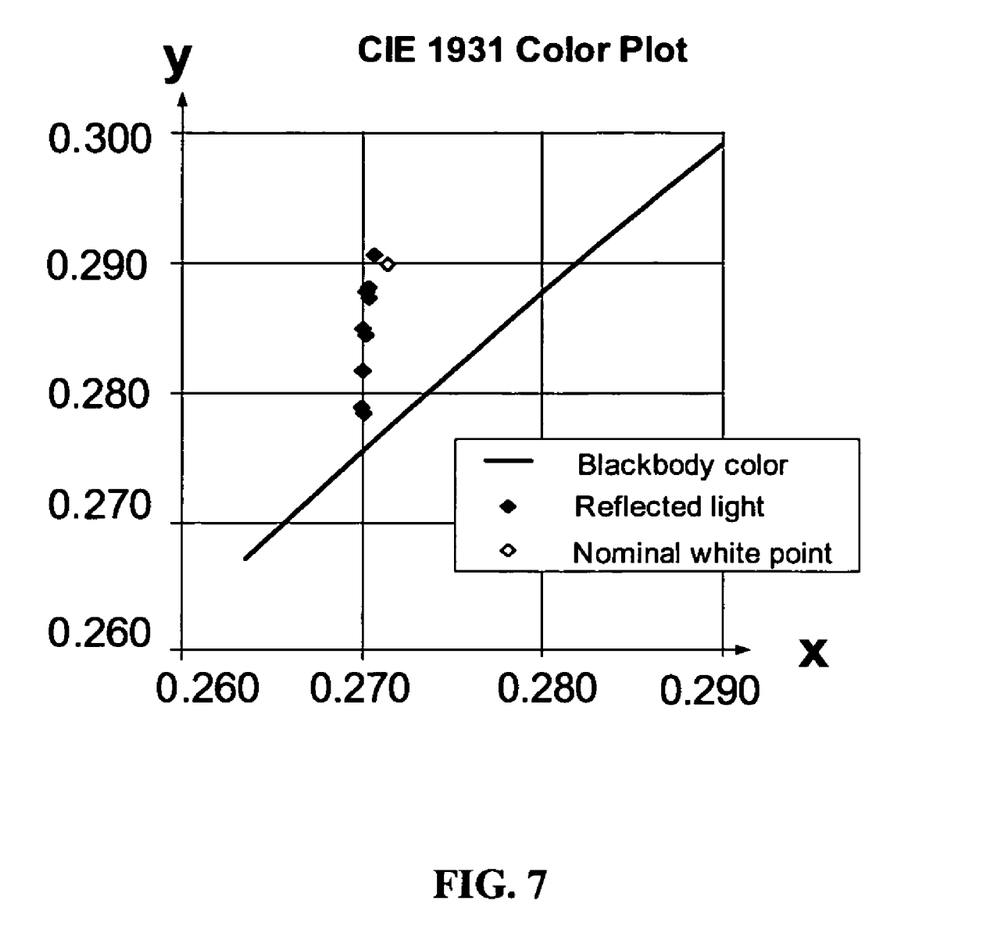
FIG. 7 is a color plot for reflected light at the 9 footprint locations of the prior art mirror.

In reference to FIG. 7, CIE 1931 color model quantifies white color imbalance across the conventional mirror 100. For incident on the mirror nominal color-uniform white light comprising p-polarized green light and s-polarized red and blue light, FIG. 7 shows a CIE 1931 color plot for reflected light at nine footprint locations marked in FIG. 4. The nominal white point is also shown in FIG. 7 as well as a blackbody color line. Chromaticity coordinates of reflected light vary for the nine footprint locations as follows: x—by about 0.001 and y—by 0.012. This variation of y coordinate is perceived by a typical observer as an obvious change in color with position. Thus, FIGS. 5-7 illustrate the fact that the color imbalance across the conventional mirror is heightened by difference in angular dependency of reflectance for differently polarized light.

As a result of discovering and attempting to understand the aforedescribed problem, an elegant and cost-effective solution has been found: properties of the coating layers of the mirror were chosen to keep reflectance of each color band fairly constant over the range of incidence angles, especially for the green light as more important to the human eye. The materials and thicknesses of the coating layers were selected to benefit from an effect of interference of p-polarized green light reflected from interfaces between the layers. Parameters of the layers were chosen so that said effect had an opposite angular dependence on AOI in comparison to reflectance of p-polarized light, thus providing at least partial compensation for decline of reflectance of the green p-polarized light with AOI.

Figure 8A:
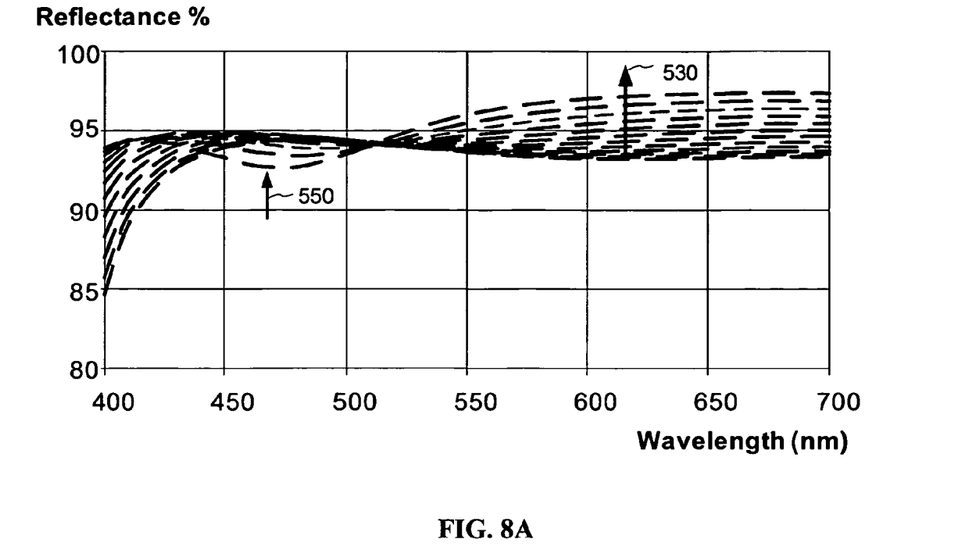
FIG. 8A is a graph of reflectance of s-polarized light vs. wavelength for various AOIs for a mirror in accordance to the current invention.
Figure 8B:
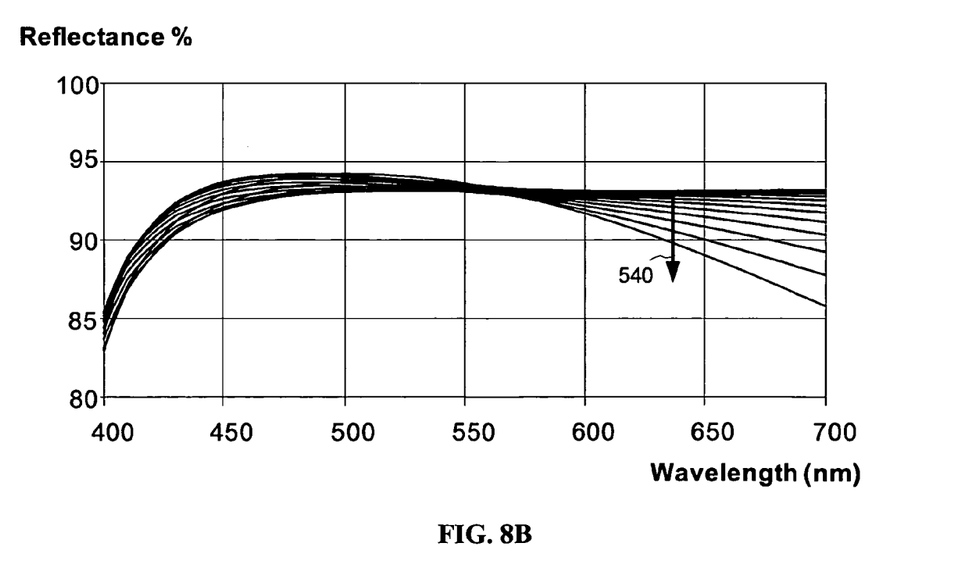
FIG. 8B is a graph of reflectance of p-polarized light vs. wavelength for various AOIs for a mirror in accordance to the current invention.

A novel mirror in accordance with this invention has dielectric layers thicker than the conventional mirror. FIGS. 8A and 8B show reflectance of the novel mirror for s- and p-polarized light, respectively, versus wavelength. Arrows 530 and 540 show change in reflectance of the s- and p-polarized light, respectively, when AOI varies from 10 to 65 degrees. The increase in thicknesses of the dielectric layers creates a reflectance dip for s-polarized light pointed to by arrow 550 in FIG. 8A, absent in FIG. 5 related to the conventional mirror with the thinner layers. The layer thicknesses in the novel mirror are adjusted so that this undesirable dip occurs in the green band and does not affect reflectance of the green light, since it has no s-polarized component. The layer thicknesses are determined to keep the green p-polarized reflectance and the red and blue s-polarized reflectance fairly constant over the range of incidence angles.

Once the white color balance problem was realized and it was discovered that intensity of the green light reflected from the mirror varies with angle beyond acceptable limits, the required properties of coating layers were determined by computer simulation of the projection system. A thin film software, similar to commercially available programs, such as TFCALC and OPTILAYER, was used for simulation. The program used the number of the layers, their materials, and the AOI range as input parameters to determine the required layer thicknesses in order to significantly lessen the variations in reflectance over the AOI range in comparison to a conventional, e.g. HR94, mirror.

The aforedescribed computer simulation resulted in the novel mirror providing a more uniform white color with position than the conventional mirror. The novel mirror, according to the exemplary embodiment of the current invention, comprises a metal reflective layer and three optically transparent layers disposed over the metal reflective layer: a first layer, which is a layer of SiO2 about 92.5 nm thick, disposed over the metal reflective layer, a second layer, which is a layer of TiO2 about 52.1 nm thick, disposed over the first layer, and a third layer, which is a layer of SiO2 about 99.5 nm thick, disposed over the second layer. The metal reflective layer in this exemplary embodiment is a 60 nm—thick aluminum layer; in other embodiments it can be made of other metals, e.g. silver or gold, and have different thickness without departing from the spirit of the current invention. The thickness of the optically transparent layers can have a random variation of 3% without the wavelength-averaged reflectance for the p-polarized green band changing by more than 0.25% (the wavelength-averaged reflectance for the red and blue bands change by less than 0.5% and 1%, respectively). Parameters of the mirror in accordance with the exemplary embodiment of current invention are provided below:

| | Air | |
|---|---|---|
| SiO2 | | 99.55 nm |
| TiO2 | | 52.06 nm |
| SiO2 | | 92.52 nm |
| Aluminum | | 60.00 nm |
| | Substrate—glass | |

Figure 9:
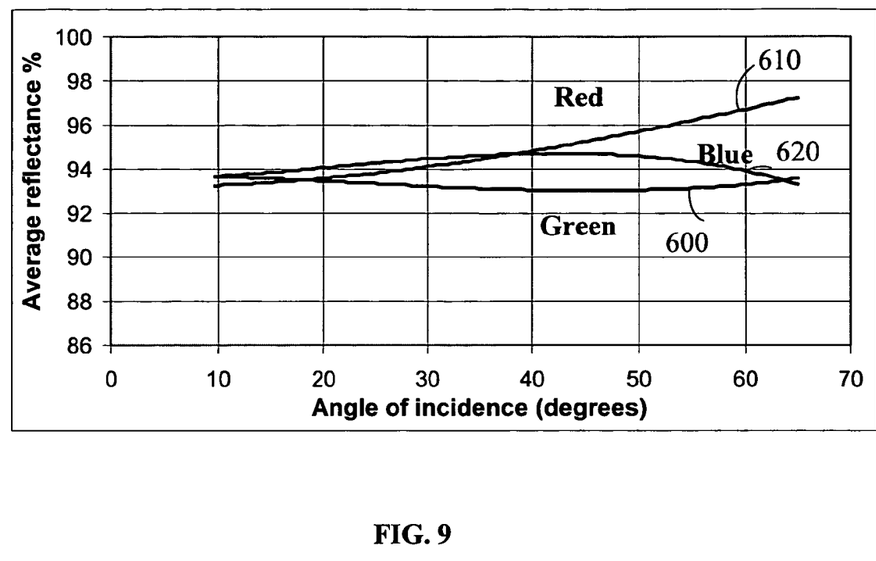
FIG. 9 is a graph of average reflectance of red, blue, and green color bands vs. AOI for a mirror according to the current invention.

FIG. 9 shows average reflectance of the mirror according to the current invention. Line 600 shows reflectance averaged over the green color band, line 610—over the red color band, and line 620—over the blue color band, versus angle of incidence for the appropriate polarization. Despite the fact that the overall reflectance of the mirror is slightly reduced in comparison to the conventional HR94 mirror, color balance of the reflected light is improved, since variation in the average reflectance for the green channel has been reduced to less than 1% and variation for the blue channel is slightly greater than 1%. The variation for the red channel is about 4%. This is an improvement in comparison to the variation of reflectance for the conventional mirror shown in FIG. 6.

The following table presents theoretical white points for the light reflected by the mirror in accordance with the current invention for nominal input white light with chromaticity coordinates of (0.271,0.290), wherein variations in coordinates x and y are marked as delta in corresponding columns:

| point | AOI | x | y |
|---|---|---|---|
| 1 | 37.4 | 0.27108 | 0.28785 |
| 2 | 9.5 | 0.27072 | 0.29011 |
| 3 | 37.4 | 0.27092 | 0.28833 |
| 4 | 49.8 | 0.2718 | 0.28793 |
| 5 | 34.0 | 0.27088 | 0.28824 |
| 6 | 49.8 | 0.27163 | 0.28845 |
| 7 | 65.0 | 0.27353 | 0.29045 |
| 8 | 58.5 | 0.27255 | 0.28915 |
| 9 | 65.0 | 0.27337 | 0.29093 |
| | delta | 0.00281 | 0.00308 |

Figure 10:
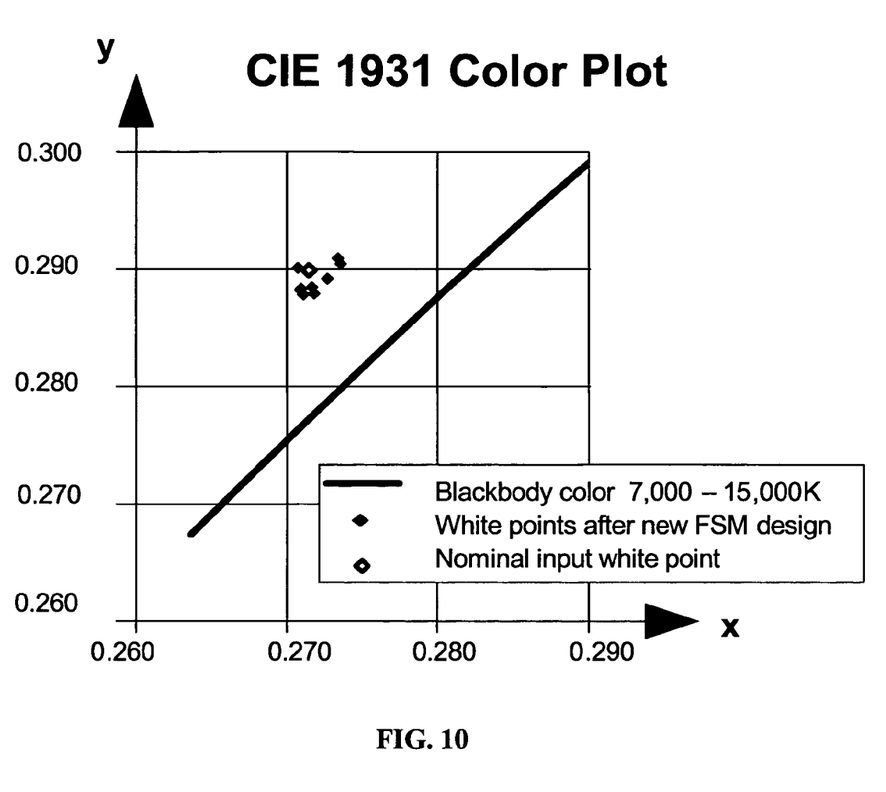
FIG. 10 is a color plot for reflected light at the 9 footprint locations shown in FIG. 4. for a mirror according to the current invention.

In reference to FIG. 10, CIE 1931 color model quantifies white color balance across the mirror 100 in accordance with the current invention. For incident on the mirror nominal color-uniform white light comprising p-polarized green light and s-polarized red and blue light, FIG. 10 shows a CIE 1931 color plot for reflected light at nine footprint locations marked in FIG. 4. The output white color is significantly more uniform than in FIG. 7 for the conventional mirror. Both, x and y, chromaticity coordinates of reflected light vary by about 0.003. This is a significant improvement over the variation of 0.012 in the y coordinate that occurs with the conventional mirror. Thus the coated mirror of the current invention significantly improves the white color uniformity across the viewing screen for a typical observer.

Of course, numerous other embodiments may be envisioned without departing from the spirit and scope of the invention. Various numbers of coating layers and other materials can be used for computer simulation. For example, Ta2O5, Nb2O5, Al2O3, MgF2, and HfO2 can be used for coating layers. The reflective layer can be of a different thickness or made of a metal other than aluminum, e.g. silver or gold, without departing from the spirit of the current invention. Obviously, different number of layers and another combination of materials will result in different parameters of a mirror. Also, a mirror can be configured for another combination of color bands and polarization states, e.g. s-polarized green light and p-polarized red and blue light. Change in the AOI range may result in different parameters of the coating layers as well.

We claim:

1. A mirror for a projection system comprising: a metal reflective layer; and, a plurality of optically transparent layers disposed over the metal reflective layer; wherein thicknesses and materials of the plurality of optically transparent layers are such that a wavelength-averaged reflectance of the mirror for p-polarized first color light varies by less than 2% over a range of angles of incidence between 0 and 65 degrees.

2. A mirror according to claim 1 wherein the p-polarized first color light is green.

3. A mirror according to claim 1 wherein the thicknesses and materials of
said optically transparent layers are such that a wavelength-averaged reflectance for s-polarized second color light varies by less than 2% over the range of angles of incidence, and a wavelength-averaged reflectance for s-polarized third color light varies by less than 5% over the range of angles of incidence.

4. A mirror according to claim 3 herein the p-polarized incident light is green, and the s-polarized second color light is one of red and blue and the s-polarized third color light is the other of red and blue.

5. A mirror according to claim 4, wherein over the range of angles of incidence the wavelength-averaged reflectance of the mirror for p-polarized first color light varies by less than 1%, the wavelength-averaged reflectance for s-polarized second color light varies by less than 1.5%, and the wavelength-averaged reflectance for s-polarized third color light varies by about 4%.

6. A mirror according to claim 1, wherein the metal reflective layer is one of aluminum, silver, and gold.

7. A mirror according to claim 1, wherein one of the materials of the plurality of optically transparent layers is one of $SiO_2$, $TiO_2$, $Ta_2O_5$, $Nb_2O_5$, $Al_2O_3$, $MgF_2$, and $HfO_2$.

8. A mirror according to claim 7 wherein the plurality of optically transparent layers comprises: a first layer disposed over the metal reflective layer, a second layer disposed over the first layer, and a third layer disposed over the second layer; wherein an index of refraction of the second layer is higher than each of indices of refraction of the first and third layers.

9. A mirror according to claim 8, wherein the first layer is a layer of $SiO_2$, between 80 nm and 100 nm thick, the second layer is a layer of $TiO_2$, between 40 nm and 60 nm thick, and the third layer is a layer of $SiO_2$, between 70 nm and 120 nm thick.

10. A mirror according to claim 9, wherein the first layer is substantially a 92.5 nm-thick layer of $SiO_2$, the second layer is substantially a 52.1 nm-thick layer of $TiO_2$, and the third layer is substantially a 99.5 nm-thick layer of $SiO_2$.

11. A projection system comprising: a beam-forming means for forming a light beam; the light beam comprising p-polarized light of a first color and s-polarized light of a second color; and, a mirror according to claim 1 for reflecting the light beam received from the beam-forming means.

12. A projection system comprising: a beam-forming means for forming a light beam; the light beam comprising p-polarized light of a first color and s-polarized light of a second color; and, a mirror according to claim 10 for reflecting the light beam received from the beam-forming means.

* * * * *